Jan. 11, 1927.
M. FRIEDLAND
1,614,427
AUTOMOBILE SIGNAL
Filed Nov. 24, 1925   2 Sheets-Sheet 1
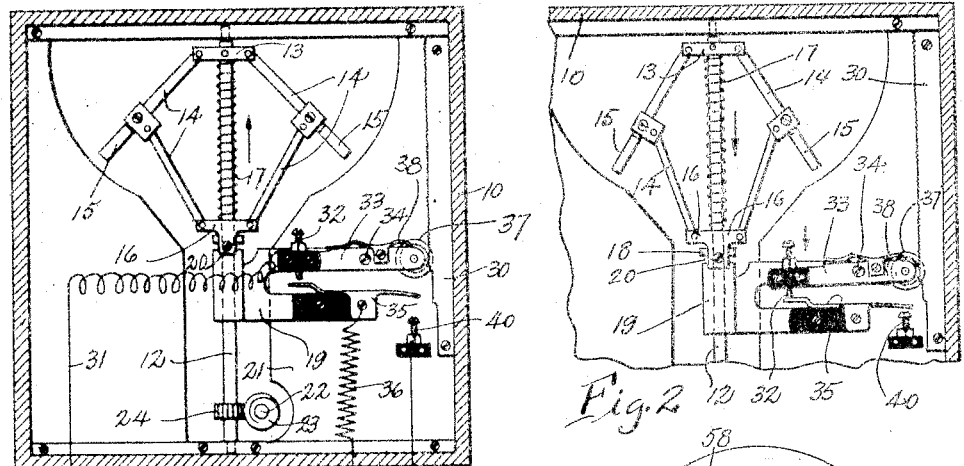
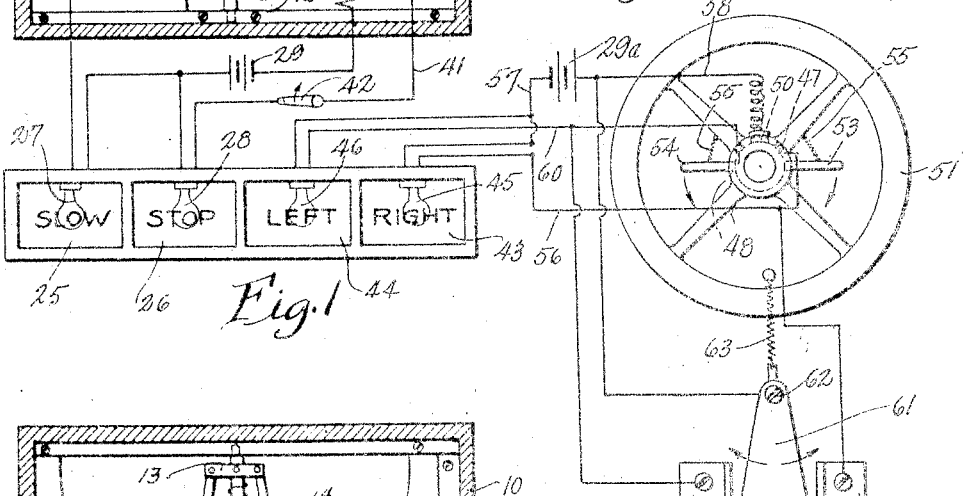
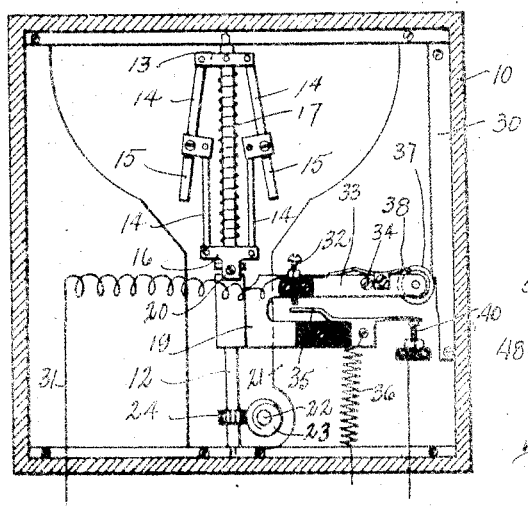
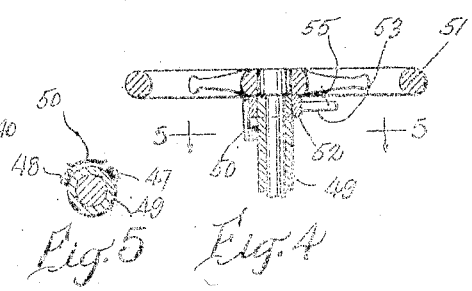
INVENTOR
M. Friedland
BY
ATTORNEY Jan. 11, 1927. 1,614,427
M. FRIEDLAND
AUTOMOBILE SIGNAL
Filed Nov. 24, 1925    2 Sheets-Sheet 2
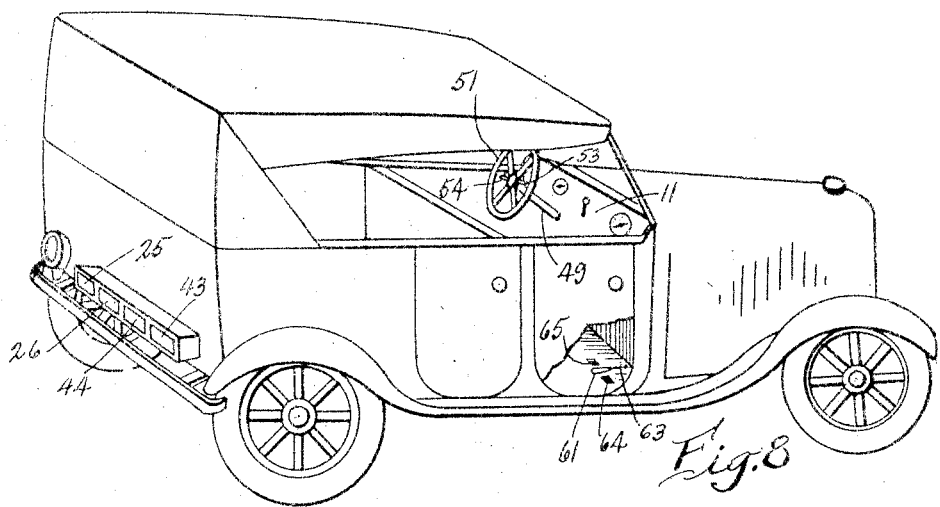
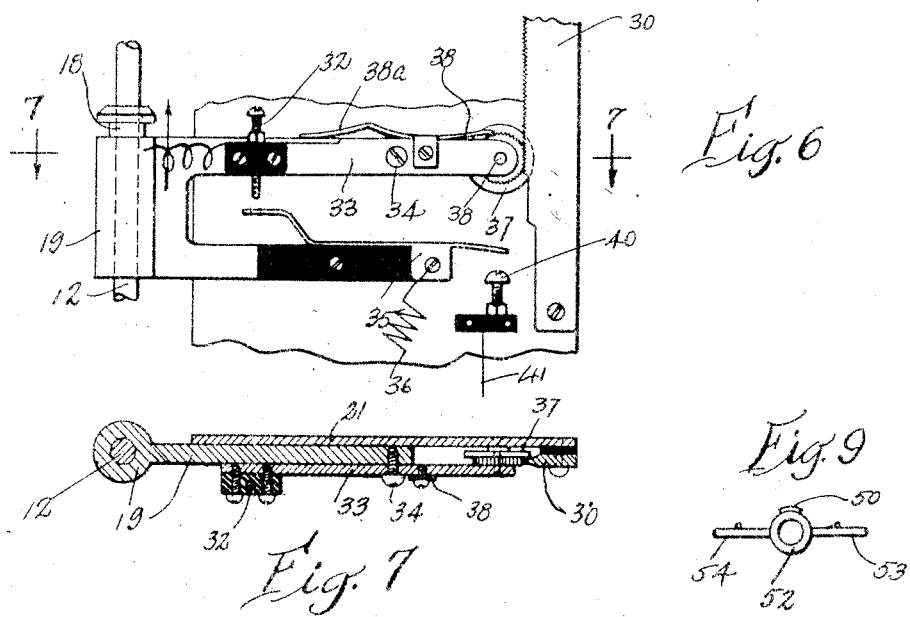
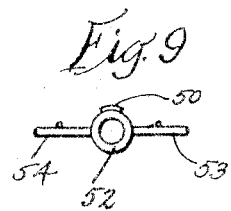
INVENTOR
M. Friedland
BY
ATTORNEY Patented Jan. 11, 1927.

1,614,427

UNITED STATES PATENT OFFICE.

MOSHE FRIEDLAND, OF BROOKLYN, NEW YORK, ASSIGNOR OF ONE-THIRD TO SAMUEL BERLIN, OF BROOKLYN, NEW YORK, AND ONE-THIRD TO TAMEN BROTHERS, CONSISTING OF BENJAMIN TAMEN AND ISADOR TAMEN, BOTH OF NEW YORK, N. Y.

AUTOMOBILE SIGNAL.

Application filed November 24, 1925. Serial No. 71,080.

This invention relates to automobile signal mechanism and has particular reference to a simple convenient and practical automatic means for indicating the intent of the driver of an automobile to those who are following him, as to stopping, slowing down, or the making of a right or left turn.

Among the objects of this invention is to provide a device so connected to a movable shaft or other part of the machine as to indicate the intention of the driver to slow down his speed and also that he is about to stop the machine, this construction being such that when the speed is being increased or running uniformly no indication will be given.

A further object of the invention is to provide improved means for giving an indication of a prospective right or left turn, such means including devices actuated coincident with the normal steering of the wheel, or capable of manual manipulation for a similar purpose before the wheel is turned.

This mechanism contemplates also the manual manipulation of a right or left turn signal mechanism by the operator's foot as well as in the region of the steering wheel.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof, reference is had to the accompanying drawings in which like reference characters designate the same parts in the several views, and in which—

Figure 1 is a diagrammatic illustration of my improvements with a view of the automatic speed controlled mechanism in elevation and with the presumption that the speed is being increased.

Fig. 2 is a fragmentary view of the speed mechanism but with the indication that the speed is being reduced.

Fig. 3 is a view of the speed controlled mechanism as in Figs. 1 and 2, but with the indication that the machine is stopped or about to stop.

Fig. 4 is a detail view partly in section of the steering wheel and associated contact members.

Fig. 5 is a transverse sectional detail on the line 5—5 of Fig. 4.

Fig. 6 is an enlarged detail view of the speed controlled mechanism, the parts being in position corresponding to an acceleration of speed.

Fig. 7 is a horizontal section on the line 7—7 of Fig. 6.

Fig. 8 is a diagrammatic view of an automobile showing the relation thereto of my improved mechanism.

Fig. 9 is a detail of the manual control.

Referring now more specifically to the drawings, 10 indicates a casing of any suitable size, construction, or design and which may be located at any convenient place, preferably one that is well protected from external influences as by being mounted upon or within the instrument board 11 of a machine. Journaled within this casing is a shaft 12 which for best results should be arranged vertically, the same having fixed at its upper end a collar 13 to which are pivotally connected by toggle links 14, a pair of weights 15. The lower ends of the links are articulated to a collar 16 slidable upward and downward along the shaft, upward against the force of an expansion spring 17 surrounding the shaft, and downward under the influence of gravity acting upon the weights 15. This collar has rotatable engagement with the neck portion 18 of a carrier 19, as through one or more pins 20 so that while the collar 16 is moved upward, the carrier 19 will be moved similarly along the shaft 12, but the carrier is held from rotation in the casing, being confined for vertical movements only. For this purpose the carrier is slidable along a guide 21 in the nature of a partition or wall of the casing.

22 indicates a shaft in the nature of a flexible shaft such as is commonly used for operating a speedometer from the driving mechanism of an automobile so as to possess a speed of rotation always proportional to the speed of the car. 23 is a worm fixed to the shaft and meshing with a worm pinion 24 on the lower end of the shaft 12. By this means the shaft will be rotated at all times at a speed corresponding precisely to the speed of the car and irrespective of the direction in which the car may be moving. In normal position the weights 15 depend as shown substantially in Fig. 3, in a manner well understood with centrifugally operated devices, and when the speed increases and the weights are caused to fly apart they will move upward around the points of connection with the collar 12 as centers, bringing upward with them the collar 16 and the carrier 19. It follows, therefore, that with every increase of speed of the machine, the carrier will be elevated in the casing, and with a corresponding decrease in speed, the carrier will be lowered toward its normal stop position as in Fig. 3.

In the practical operation of automobiles I found it desirable and ought to be made mandatory by municipal or legislative enactments for all road vehicles to be so equipped as to enable visible signals to be displayed on the rear of the car indicating to those in the rear of the car the legends "Stop" and "Slow," these signals being made visible prominently by use of suitable electric lamps in circuit with any suitable battery such as the ignition battery.

In carrying out this proposition in a practical manner I have developed and show herein mechanism including signal members 25 and 26 in which are secured lamps 27 and 28 respectively both in circuit from the battery 29 and having suitable contacts located within the casing 10.

30 indicates a guide rack fixed within the casing and adjacent to which the carrier 19 is movable up and down. The circuit wire 31 from the battery through the lamp 27 leads to and is connected to a contact member shown in the nature of an adjustable screw 32 carried by one end of a rocker or tilting member 33 pivoted at 34 on the carrier and whose other end has co-operation with the rack 30.

The carrier, shown best in Fig. 6, is bifurcated, to the upper leg of which the rocker is pivoted, and in spaced relation thereto the lower leg carries a duplex contact member 35. The screw contact 32 is normally spaced from the inner end of the contact 35 except when the speed of the car is being reduced, at which time the circuit is closed between the contacts 32 and 35 and the return wire 36 leads from the contact 35 back to the battery or to a suitable ground as preferred.

Any suitable means may be provided to co-operate with the rack and rocker 33 to effect the desired results. I show, however, a guide wheel 37 journaled at 38 on the outer end of the rocker, said wheel having a flange rolling against the side of the rack to hold the rocker and carrier in normal position and in substantially the same plane while the carrier is movable up or down. The wheel also has teeth meshing with the teeth of the rack, and a spring pawl 38 has co-operation with the teeth of the wheel.

While the carrier is moving upward and the teeth of the wheel are meshing with the teeth of the rack 30, the pawl 38 exerting at this time a frictional or retarding action upon the wheel 37 sufficient to compel the rocker to have a slight clockwise movement according to the illustrations, thereby insures that the contact 32 will be elevated and spaced from the relatively fixed contact 35, breaking the circuit at such point. This condition obtains so long as the speed of the car is being increased or remains stationary. When, however, the speed is reduced and the balls 15 gravitate to any material extent downward toward the position of Fig. 3, the collar 16 and carrier 19 move downward but the outer end of the rocker 33 is held stationary momentarily by the teeth of the rack 30, being retarded or resisted in its counter clockwise rotation by the detent or pawl 38 with the result that the contact 32 swings downward into engagement with the contact 35 closing the circuit through the lamp 27 and causing the legend "Slow" to show. If the driver persists in reducing the speed the same signal will continue to show. If, however, he increases his speed for any reason the circuit will be again broken at the contacts 32 and 35.

The effect of the spring 17 is to co-operate with the gravitational effect on the balls 15 so as to force the carrier 19 downward at a uniform or substantially uniform rate of speed according to the reduction of speed of the vehicle or the driver's intent to come to a stop. While the carrier is moving downward and with the rocker tilted as shown in Fig. 2, the rotation of the wheel 37 will be retarded but not resisted by the pawl 38, whose point at this time will permit the wheel to slip thereunder, but at the same time the tilted position of the rocker will be maintained so long as the carrier will be moving downward. This wheel, therefore, typifies any convenient means to compel or tend to compel the outer or rack end of the rocker to be retarded in its movement in either direction with respect to the carrier as a whole, thereby causing the rocking action that is necessary to make or break the circuit at the contacts 32 and 35. When the carrier has become lowered to a sufficient degree when the vehicle is about to be brought to a stop the wheel 37 passes the lower end of the rack teeth, permitting the outer end of the rocker to be thrown downward momentarily by the inner end 38ª of the pawl shank or spring. If, for example, the driver intends to come to a stop and is slowing down, the driver at the rear will understand that it is said driver's intention to come to a stop when the lamp 28 is illuminated and the legend "Stop" appears at the casing 26. This result is produced by the outer end of the contact 35 coming into engagement with a fixed but adjustable stop 40 whereby the circuit is closed from the battery through the line 36 and line 41 through the lamp 28. After the car comes to a stop the signal 26 will continue to show until the car is started again, but if the car is to be left for any substantial length of time and it is not desired for this signal to be continued the circuit through the line 41 and lamp 28 may be broken by a manual switch 42, but this switch normally is closed.

In the same system and as indicated at 43 and 44 are right and left turn signals with the corresponding legends "Right" and "Left" with lamps 45 and 46 therein respectively. To complete the circuits through these lamps I provide manually controlled mechanism either for hand or foot operation as may be preferred in any instance. The preferred construction is shown in Fig. 1 as comprising a pair of contacts 47 and 48 fixed to the stationary steering post 49 and in spaced relation to each other, while a movable spring contact 50 located normally between them is attached either directly or indirectly to the steering wheel 51. As shown this movable contact 50 is carried by a collar 52 journaled upon the steering post 49 and provided with right and left finger pieces 53 and 54, respectively, flexibly connected to the steering wheel as by springs 55. According to this arrangement, when the steering wheel is rotated toward the right or left for a right or left turn respectively in the usual manner, the collar 52 and parts associated therewith are rotated in a corresponding direction due to the spring connection 55 and after the wheel is so moved through a relatively short arc, contact is completed between the movable contact 50 and one or the other of the fixed contacts 47 or 48. If the wheel is moved for a right turn the circuit is completed through the line 56, lamp 45, and line 57, battery 29ª and line 58, connected to the movable contact 50. If moved to the left the circuit will be closed through the line 60, lamp 46, and line 57. For the purpose of advising the oncoming driver in ample time as to the intent of making the subsequent turn to the right or left it is desirable that the indication be given to him before beginning to make the turn. To this end the finger piece 53 may be depressed against the force of the spring 55 to complete the circuit at the contacts 50 and 47, or for a left turn the finger piece 54 may be depressed in the direction of the arrow completing the circuit at the contacts 50 and 48. Obviously either finger piece may be moved in either direction according to whichever hand is the freer for such purpose, and this movement of the contact 50 will not affect the position or function of the wheel as a steering member. When, however, the wheel is turned for steering purposes it is unnecessary to manipulate the finger pieces 53 or 54, and furthermore there is nothing to resist the usual free movement of the wheel through a considerable arc for the purpose of making a short turn. That is to say, the contact 50 rides freely enough over the contacts 47 and 48 to permit the wheel to be turned as much as necessary. Instead of actuating the finger piece 53 or 54, the same effect of indicating in advance of the turning movement of the steering wheel, the intention to turn to the right or left, the circuit may be closed by a foot piece 61 pivoted at 62 and held normally by means of a contractile spring 63 spaced between the two contacts 64 and 65 in circuit respectively with the lamps 45 and 46. Either manual means for displaying the signals may be employed according to the exigencies of any particular case or the desire of the operator.

It will now be seen that I have provided a simple relatively cheap and yet reliable signal mechanism, usually automatic for the display of a number of different signal indications. The device has been proved to be highly efficient both in construction and operation and is not likely to get out of order or become disarranged.

I claim:

1. Signal mechanism for vehicles including a slow indicator, a source of power and circuit connections, said connections including a carrier, means to move the carrier in a certain direction with the increase of speed of the vehicle, means to move the carrier automatically in the other direction on decrease of speed of the vehicle, said carrier including a rocker pivoted between its ends and having tilting movement independent of the movement of the carrier, said rocker carrying at one end a contact member, and means to cause the other end of the rocker to be retarded in its movement with respect to the carrier initially in either direction of movement of the carrier, thereby causing the rocker to tilt and whereby in the movement of the carrier in one direction the circuit is closed through said contacts and indicator, and in the movement of the carrier in the other direction the circuit is broken.

2. In signal mechanism for automobiles, the combination with a pair of signal members to indicate slow and stop respectively, a source of energy, wiring connections between the signal members and the source of energy, a carrier, and means to move the carrier according to the speed of the automobile, of a stationary contact in circuit with the stop signal, a movable contact on the carrier in circuit with the source of energy, a third contact, means to mount said third contact on the carrier for movement, with the second mentioned contact and independently thereof, the third contact being likewise on the carrier and in circuit with the slow signal, means to cause the movable contacts to engage each other and move as a unit and close the circuit through the slow signal while the speed of the automobile is being reduced and maintained in engagement until the stopping moment is approached, and means then acting to separate said movable contacts and bring the first two contacts together.

In testimony whereof I affix my signature.

MOSHE FRIEDLAND.